(12) United States Patent
Plathe

(10) Patent No.: US 9,438,019 B2
(45) Date of Patent: Sep. 6, 2016

(54) MULTI-HUB ELECTRICAL FITTING

(71) Applicant: Henry J. Plathe, Dedham, MA (US)

(72) Inventor: Henry J. Plathe, Dedham, MA (US)

( * ) Notice: Subject to any disclaimer, the term of this patent is extended or adjusted under 35 U.S.C. 154(b) by 0 days.

(21) Appl. No.: 14/630,115

(22) Filed: Feb. 24, 2015

(65) Prior Publication Data

US 2015/0280411 A1    Oct. 1, 2015

Related U.S. Application Data

(60) Provisional application No. 61/970,097, filed on Mar. 25, 2014.

(51) Int. Cl.
| | | |
|---|---|---|
| *H02G 3/18* | (2006.01) | |
| *H02G 3/08* | (2006.01) | |
| *H02G 3/06* | (2006.01) | |
| *H01R 13/74* | (2006.01) | |
| *H01R 31/02* | (2006.01) | |

(52) U.S. Cl.
CPC .............. *H02G 3/083* (2013.01); *H01R 13/74* (2013.01); *H01R 31/02* (2013.01); *H02G 3/0625* (2013.01); *H02G 3/18* (2013.01)

(58) Field of Classification Search
CPC ........ H02G 3/22; H02G 3/0625; H02G 3/18; H02G 3/083; H02G 3/36; H02G 3/30; H02G 3/06; H02G 3/0691; H01R 13/74; H01R 13/745; H01R 31/02
USPC ...... 174/50.52, 59, 74 R, 82, 660, 650, 652, 174/659, 665, 668, 666, 84 R, 88 R; 439/535, 544
See application file for complete search history.

(56) References Cited

U.S. PATENT DOCUMENTS

| | | |
|---|---|---|
| 2,195,933 A | 4/1940 | Marlborough et al. |
| D187,594 S | 4/1960 | Stover |
| D187,792 S | 5/1960 | Stover |
| 2,962,542 A | 11/1960 | Witt |
| 3,031,638 A * | 4/1962 | Bertram ............... F17D 1/00 439/745 |
| 3,187,088 A | 6/1965 | Warner |
| 3,411,163 A | 11/1968 | Myers, Jr. |
| 4,399,371 A * | 8/1983 | Ziff .................. H02G 3/00 307/147 |
| 4,723,054 A | 2/1988 | Billet |
| 4,899,401 A | 2/1990 | Savarese |
| 5,055,064 A | 10/1991 | Imaizumi et al. |
| 5,288,947 A | 2/1994 | Stewing |
| 5,532,436 A | 7/1996 | Moyers et al. |
| 5,662,488 A * | 9/1997 | Alden ............. H01R 13/625 439/314 |
| 5,714,715 A | 2/1998 | Sundhararajan et al. |
| 5,941,718 A | 8/1999 | Didier |

(Continued)

FOREIGN PATENT DOCUMENTS

| | | |
|---|---|---|
| JP | 5196960 (B2) | 5/2013 |
| WO | WO 03/094321 A1 | 11/2003 |

*Primary Examiner* — Dimary Lopez Cruz
(74) *Attorney, Agent, or Firm* — Daly, Crowley, Mofford & Durkee, LLP

(57) ABSTRACT

A multi-hub electrical fitting for electrical cable or conduit includes a connector body constructed of metal, said connector body including an inbound end and an outbound end; a plurality of inbound bores in said inbound end of said connector body; an outbound bore in said outbound end; an end stop within said connector body segregating said inbound bores from said outbound bores; an attachment arrangement on said inbound end for securing and holding electrical cable or conduit within each inbound bore; and an attachment arrangement on said outbound end for securing said electrical fitting to a panel or pipe.

17 Claims, 9 Drawing Sheets

(56) References Cited

U.S. PATENT DOCUMENTS

| | | | |
|---|---|---|---|
| 6,045,403 A | 4/2000 | Werner et al. | |
| 6,194,661 B1 | 2/2001 | Gretz | |
| 6,355,884 B1 | 3/2002 | Gretz | |
| 6,409,179 B1 | 6/2002 | Daoud | |
| 6,521,831 B1 | 2/2003 | Gretz | |
| 6,918,785 B1 * | 7/2005 | Reilly | H01R 13/5804 439/464 |
| 7,075,007 B2 | 7/2006 | Auray et al. | |
| 7,115,822 B1 | 10/2006 | Day et al. | |
| 7,151,223 B2 | 12/2006 | Auray et al. | |
| 7,304,251 B1 | 12/2007 | Gretz | |
| 7,329,144 B1 | 2/2008 | Gretz | |
| 7,402,752 B1 | 7/2008 | Kiely | |
| D581,877 S | 12/2008 | Kiely | |
| 7,521,634 B2 | 4/2009 | Clem et al. | |
| D600,649 S | 9/2009 | Smith | |
| D600,650 S | 9/2009 | Smith | |
| 7,582,831 B2 | 9/2009 | Kiely et al. | |
| 7,723,623 B2 | 5/2010 | Kiely et al. | |
| 7,931,619 B2 | 4/2011 | Diamond et al. | |
| 7,952,034 B2 | 5/2011 | Kiely et al. | |
| 7,955,125 B1 * | 6/2011 | Petrillo | H01R 9/24 439/535 |
| 7,973,241 B2 | 7/2011 | Evoniuk et al. | |
| 7,985,094 B2 * | 7/2011 | Dennes | H01R 4/2433 439/409 |
| 8,119,933 B2 | 2/2012 | Auray et al. | |
| 8,124,891 B1 | 2/2012 | Gretz | |
| 8,172,589 B2 * | 5/2012 | Johnson | H01R 25/16 174/60 |
| 8,235,748 B2 * | 8/2012 | Lacey | H02G 3/18 439/502 |
| 8,242,369 B2 | 8/2012 | Kiely et al. | |
| 8,350,163 B2 | 1/2013 | Auray et al. | |
| 8,456,036 B2 | 6/2013 | Kotlyar et al. | |
| 8,513,543 B1 | 8/2013 | Lin | |
| D699,195 S | 2/2014 | Smith | |
| 2012/0292100 A1 | 11/2012 | Thomas | |
| 2013/0171881 A1 | 7/2013 | Golen | |

* cited by examiner

MULTI-HUB ELECTRICAL FITTING

CROSS REFERENCE TO RELATED APPLICATION

This application claims priority from U.S. Provisional application Ser. No. 61/970,097 filed on Mar. 25, 2014 which is incorporated herein by reference.

FIELD OF THE INVENTION

This disclosure relates generally to electrical cable connectors or fittings and more particularly to a connector which can accommodate multiple cables or conduits into a single opening to be used in an electrical panel compartment.

BACKGROUND

As is known in the art, it is necessary to distribute electrical power using electrical cable or conduit throughout a building from central distribution points. Depending on the size of the building and the power requirements required by the activities within the building, the distribution system may include in addition to the main electrical distribution panel, one or more subsystem electrical distribution panels as well as connection boxes to feed power throughout the building. In large buildings, distribution panels are disposed in electrical closets and electrical cable or conduit from an end point is fed back to the distribution panel. In the distribution panel, a hole must be drilled or punched into the distribution panel to accommodate each electrical cable or conduit. This process is repeated over and over depending on the quantity of cable or pipe. At times a certain amount of predrilled holes may be included in the electrical distribution panel.

It should be appreciated when many electrical cables are required to be connected into a distribution panel, the time spent to drill the holes to accommodate the many electrical cables and conduits can be costly. Furthermore, feeding the many electrical cables to the distribution panel and be unwieldy looking like mixed spaghetti and giving the installation an unprofessional appearance.

SUMMARY

In accordance with the present disclosure, a multi-hub electrical fitting for electrical cable or conduit includes a connector body constructed of metal, said connector body including an inbound end and an outbound end; at least three inbound bores in said inbound end of said connector body; an outbound bore in said outbound end; an end stop within said connector body segregating said inbound bores from said outbound bores; an attachment arrangement on said inbound end for securing and holding electrical cable within each inbound bore; and an attachment arrangement on said outbound end for securing said electrical fitting to a panel or conduit pipe. With such an arrangement, electrical cable or conduit can be more efficiently connected to an electrical distribution system or larger conduit pipe.

In one embodiment, an electrical connector assembly includes a connector body having an outlet end portion and an inlet end portion; at least three inlet openings disposed in the inlet end portion adapted to receive electrical cable or conduit; and an outlet opening disposed in the outlet end portion. The electrical connector assembly may further include means for securing electrical cable or conduit to an inlet opening. For example, one means for securing electrical cable or conduit to an inlet opening may include retaining tangs being inwardly bent at an angle relative to the surface of said inlet opening in the direction of said outlet end portion whereby said cable retaining tangs permit insertion of a cable or conduit therethrough and prohibits unintentional separation of a cable or conduit therefrom. Also, each inlet opening may include an inspection hole to be able to view a cable or conduit inserted in the inlet opening. In one embodiment, the electrical connector assembly is configured wherein the at least three inlet openings number eighteen and the inspection holes are aligned so an inner inspection hole can be viewed through an outer inspection hole so that the cables inserted in the inner inlet openings can be viewed. With such an arrangement, a cost savings to a contractor is provided by reducing the number of steps and material required to terminate multiple cables at any given location. Furthermore, the aligned inspection holes meet the requirement of NEC 320.40 which requires the connector or clamp by which the Type AC cable is fastened to boxes or cabinets shall be of such design that the insulating bushing or its equivalent will be visible for inspection.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Before discussing the features of the invention, it may be helpful to review certain terms used in the electrical construction industry. BX is a general term used in electrical construction when referring to metal clad and armored clad cable. The National Electrical code identifies this cable more specifically as Type AC and Type MC, Type TC, each with many specific subcategories. Flex is another general term used in electrical construction when referring to many specific types of flexible tubing and conduit. More specifically the National Electrical code identifies this cable as Type LFMC, Type FMC, Type LFNC and Type FMT, each with many specific categories.

In general, all wiring methods including electrical metallic tubing, cable and flex require a terminating fitting at each location in an electrical circuit where apparatus or splicing is required. There are many single cable fittings available today to accommodate this function. Similarly when two cables are required to be terminated together there are also many two cable single fittings available to accomplish this. These are generally referred to as a duplex connector or fitting. However when more than two cables need to be terminated at a location, the electrician must resort to some combination of junction box, duplex and single cable connectors. A single fitting would be desired to terminate three or more cables into a distribution panel.

Figure 1:
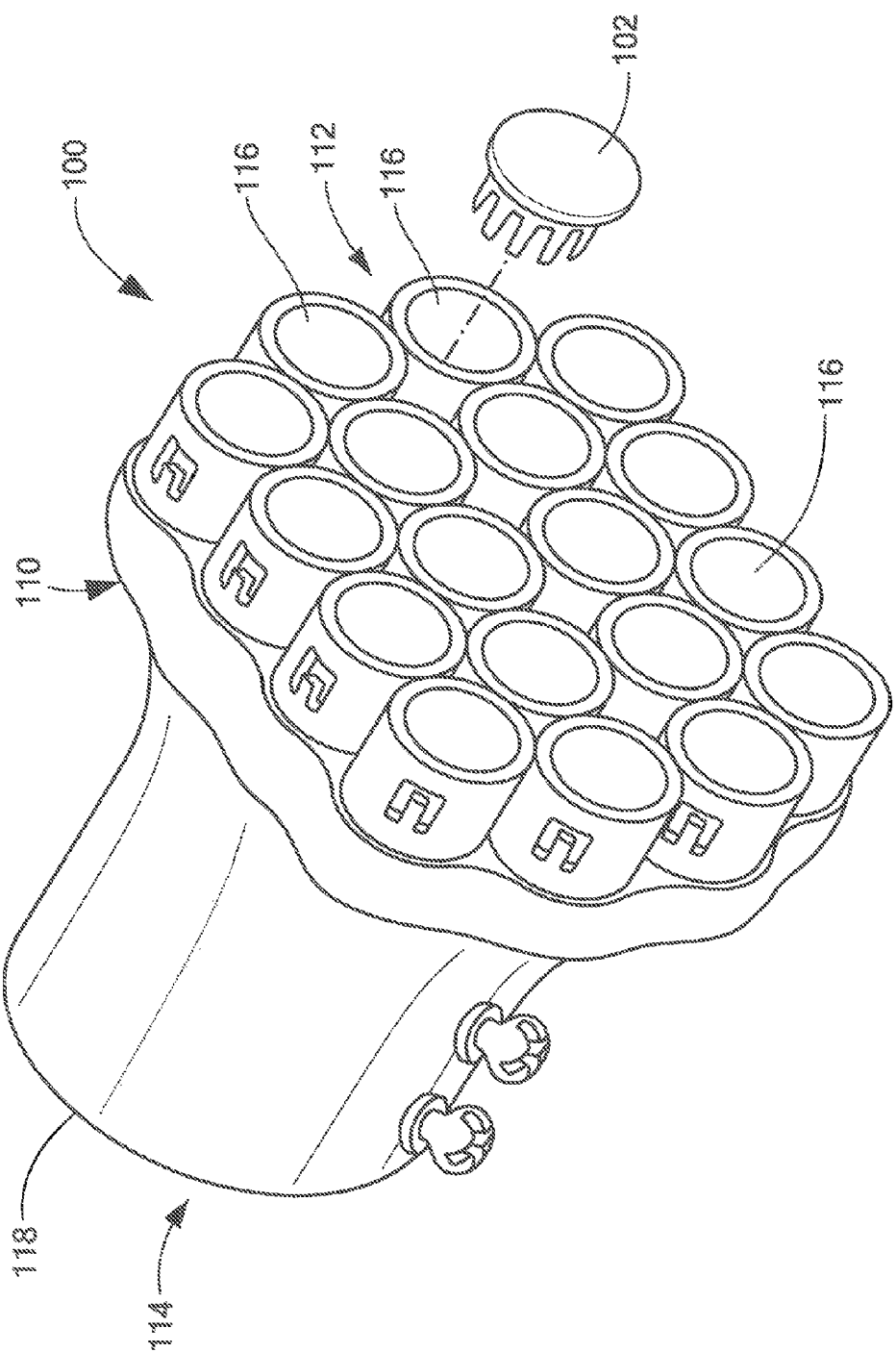
FIG. 1 is a view of a multi-hub electrical fitting according to the disclosure.
Figure 1A:
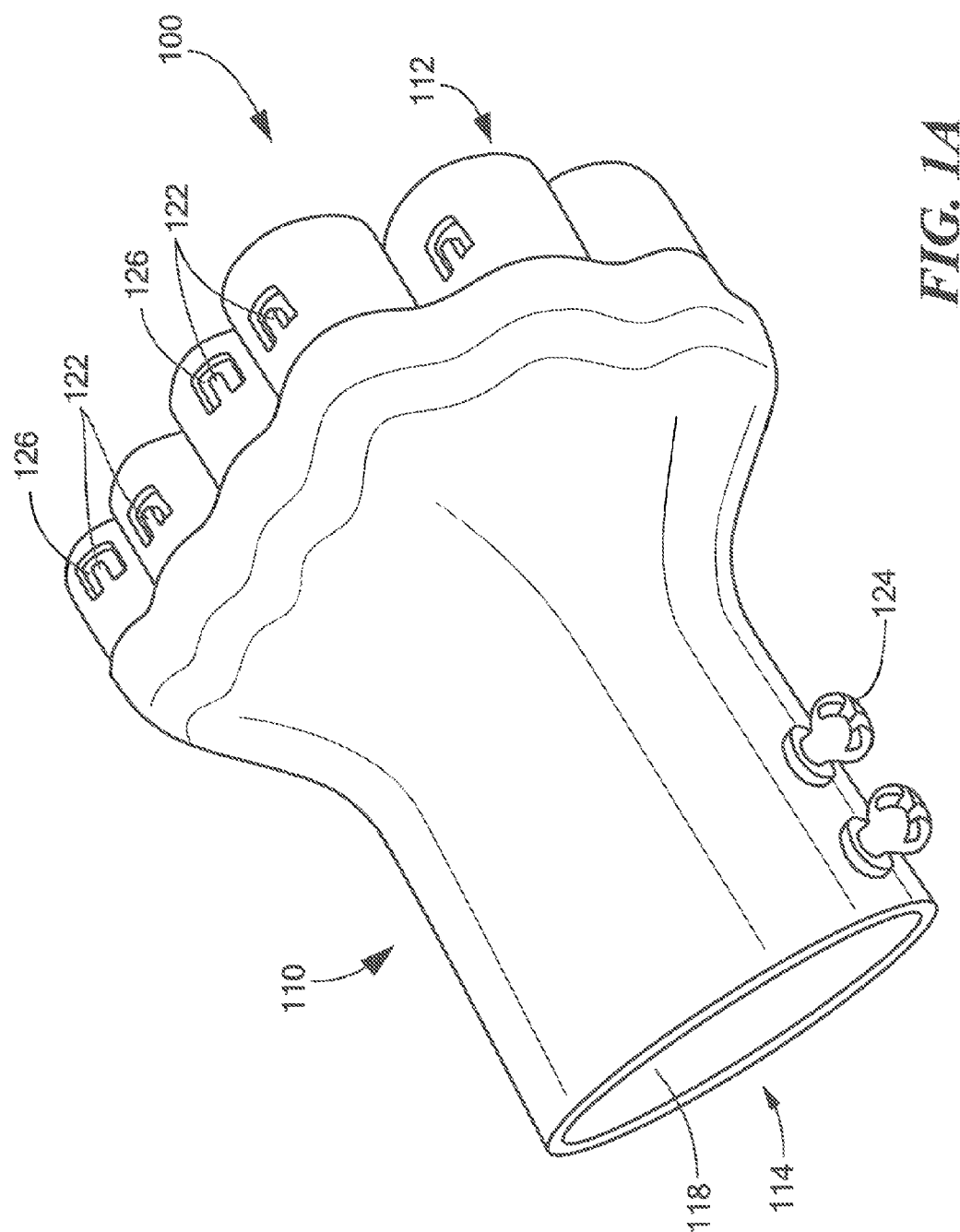
FIG. 1A is a different view of a multi-hub electrical fitting according to the disclosure.
Figure 1B:
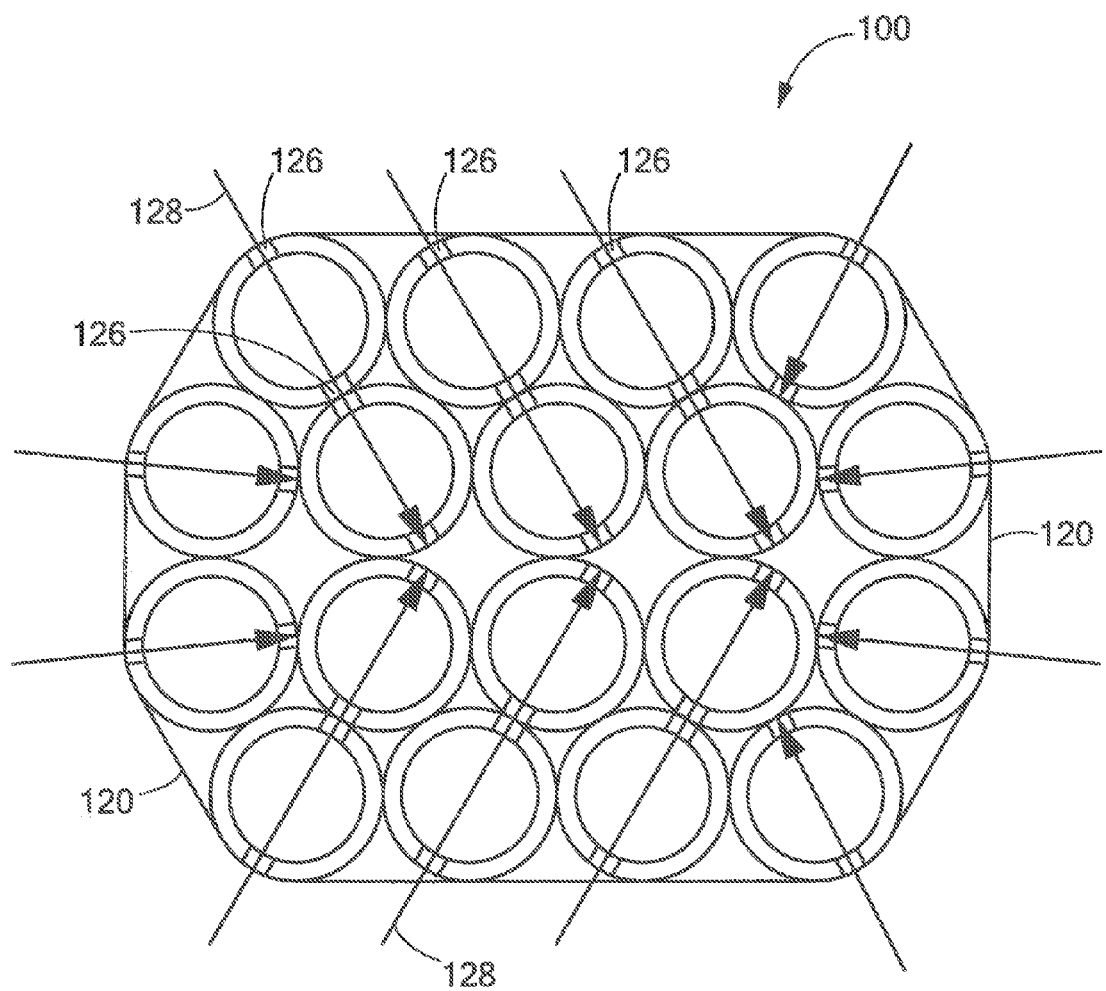
FIG. 1B is a plain cross cut view of a multi-hub electrical fitting showing an arrangement of the inspection holes according to the disclosure.
Figure 2:
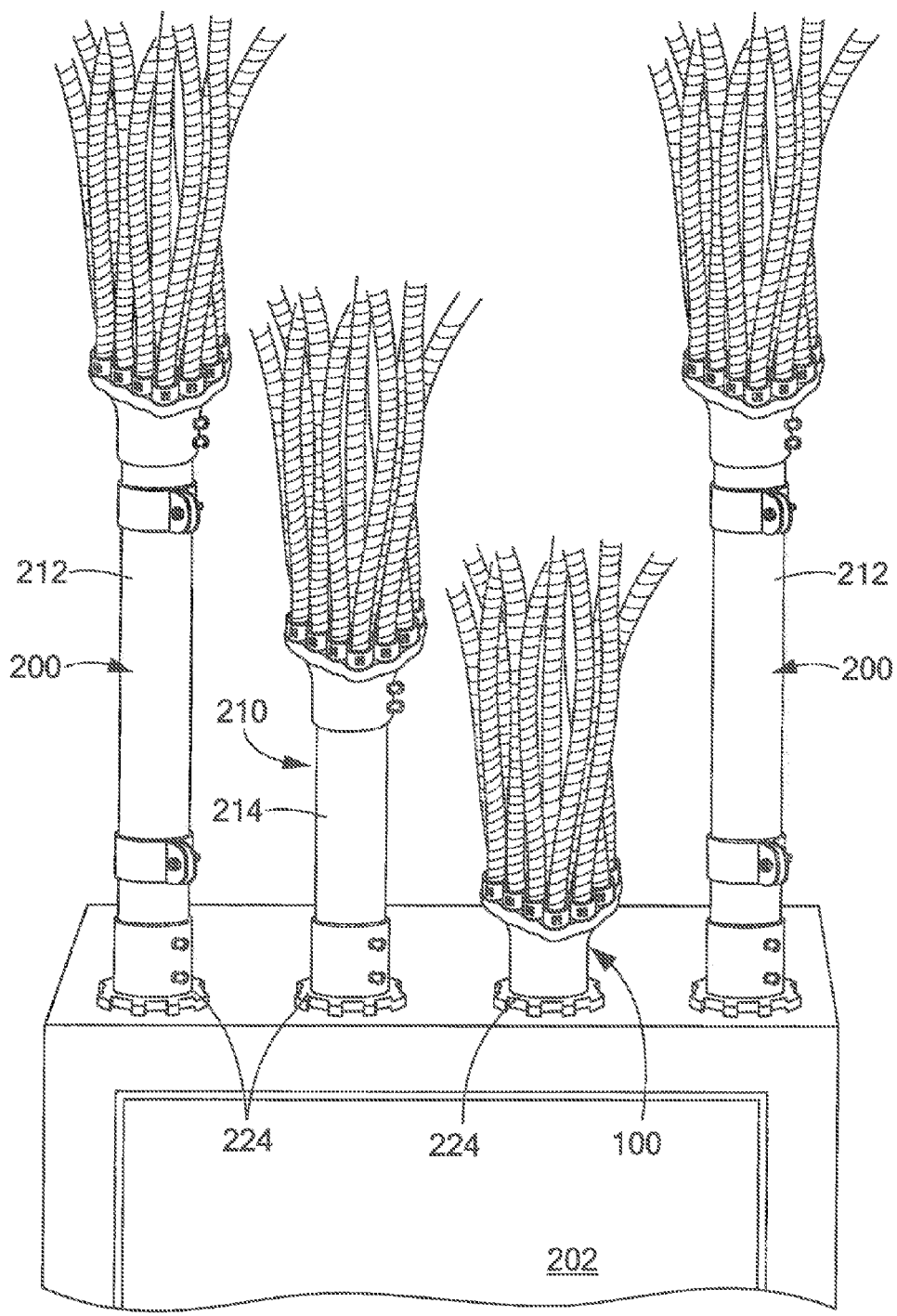
FIG. 2 is a view of a plurality of multi-hub electrical fillings connected to a distribution panel according to the disclosure.

Referring now to FIGS. 1, 1A and 1B, an electrical connector assembly, here referred to as a multi-hub electrical fitting 100 is shown capable of receiving multiple cables and eliminating the need for additional connectors and junction boxes. The multi-hub electrical fitting 100 can be constructed for all trade size conduit openings including conduit pipe or electrical cable to receive three or more cables at a single entry point. The multi-hub electrical fitting 100 is a cable connector on one side (to receive the cables) and a termination side to connect to a distribution panel, a large junction box, pipe or any other apparatus using thread and lock-nut, EMT, conduit, or any other connection technique. The multi-hub electrical fitting 100 includes a connector body 110 constructed of metal with the connector body 110 including an inbound end 112 and an outbound end 114. The connector body 110 can be fabricated from a single piece of metal or two or more pieces of metal connected together using any known technique. The inbound end 112 of the connector body 110 includes a plurality of inbound bores 116, here eighteen holes as shown, for receiving electrical cable (not shown). An outbound bore 118 is included in said outbound end 114. An end stop 120 within said connector body 110 segregates said inbound bores 112 from said outbound bore 118. An attachment arrangement 122 on said inbound end 112 is used for securing and holding electrical cable within each inbound bore 116. Here tangs are in included in each bore 116 to capture the electrical cable and secure the electrical cable to the inbound bore 116. More specifically the attachment arrangement 122 on said inbound end 112 includes retaining tangs being inwardly bent at an angle relative to the surface of said bore 116 in the direction, of said outbound end 114 whereby said cable retaining tangs permit insertion of a cable therethrough and prohibits unintentional separation of a cable therefrom. In an alternative embodiment, a corresponding bushing is disposed within each inbound bore with a cylindrical body portion frictionally fitted within said inbound bore and the retaining tangs extend from the bushing. In a still alternative embodiment the attachment arrangement 122 on said inbound end includes an electrical push-in fitting for each inbound bore to hold an electrical cable in the inbound bore. Alternatively, the electrical cable can be secured to the inbound bore 116 using any other known technique for securing an electrical cable to the inbound bore 116. An attachment arrangement 124 is used on said outbound end 114 for securing said electrical fitting to a pipe here using screws. Alternatively, as shown in FIG. 2, the outbound end 114 can include a threaded end and can be secured to an electrical panel using a lock nut. Alternatively, the outbound end 114 can be configured using any other known technique for securing an electrical fitting to an electrical panel, conduit pipe, or any other electrical apparatus. It should be appreciated the outbound end 114 can be configured either to form a standard box connection or conduit pipe connection. With such an arrangement, a cost savings to a contractor is provided by reducing the number of steps and material required to terminate multiple cables at any given location. Another advantage would be the ability to utilize all existing openings in electrical equipment not limited to the ones sized for single and duplex connectors. Another advantage would be to maximize the use of limited available space in some equipment and the ability to provide quick access to equipment for future expansion. It should also be appreciated that better cable management within equipment by consolidating the cables to a central location is more easily achievable. Still another advantage is the ability to eliminate costly junction boxes and wire-ways used for cable management at electric panel-board locations. The multi-hub electrical fitting provides an additional benefit where a single entry point in equipment is provided although multiple cables are required to enter.

Where in the past, eighteen single cable connectors would be used if openings are available or enough space to be drilled or alternatively nine duplex connectors could be used if the openings are available or drilled, with the multi-hub electrical fitting 100, one 2" multi-hub electrical fitting 100 could accommodate all eighteen cables with just one opening. It should be noted in a situation where not all eighteen inbound bores are needed, for example, only sixteen cables need to be terminated, a cover or cap 102 or plug is placed over the unused inbound bores to prevent access into the inbound bore. The latter provides a safety mechanism so lose wire or other items cannot enter the fitting.

Referring to FIG. 1B, it should be noted inspection holes 126 are arranged so that a corresponding inspection hole 126 is disposed in the connector body 110 extending internally from the connector body 110 to an inner wall of an internal inbound bore 116 and the inspection holes 126 are aligned so an inner inspection hole 126 can be viewed through a outer inspection hole 126. The inspection hole 126 provides a means for viewing the inbound bore 116 to view a cable when inserted into the inbound bore to ensure the cable has been satisfactorily inserted. The end stop 120 provides a means to prevent the cable from being overly inserted and entering the outbound bore 118. Arrows 128 show the angle of view from the outer inbound bores 116 to the inner inbound bores 116. In practice, cable (not shown) is first inserted and secured in the inner inbound bores 116 and then once the inner inbound bores 116 are used, the outer inbound bores 116 are used since there is no longer a need to be able to view through them to the inner inbound bores.

Referring now to FIG. 2, an electrical distribution panel 202 is shown with a first multi-hub electrical fitting 100, a second and a third multi-hub electrical fitting 200 and a fourth multi-hub electrical fitting 210 attached to the electrical distribution panel 202. Each of the multi-hub electrical fittings are attached using thread and lockouts 224 to the electrical distribution panel 202. As can be seen, unlike multi-hub electrical fitting 100, second and a third multi-hub electrical fitting 200 is fabricated with an elongated neck 212 of one length and fourth multi-hub electrical fitting 210 is fabricated with a different length elongated neck 214. It should be appreciated that the fourth multi-hub electrical fitting 210 can be fabricated with the elongated neck as one piece or alternatively a conduit pipe can be used with a multi-hub electrical fitting attached to the pipe. Here the four multi-hub electrical fittings are configured to receive eighteen cables and terminate to a 2" standard electrical trade size thread. With such an arrangement, seventy-two electrical cables can be distributed from the distribution panel 202 without the mess and time required to drill and connect seventy two cables to the distribution panel 202. It should also be appreciated that more real estate is available on the distribution panel 202 to add additional multi-hub electrical fittings as needed.

Figure 3:
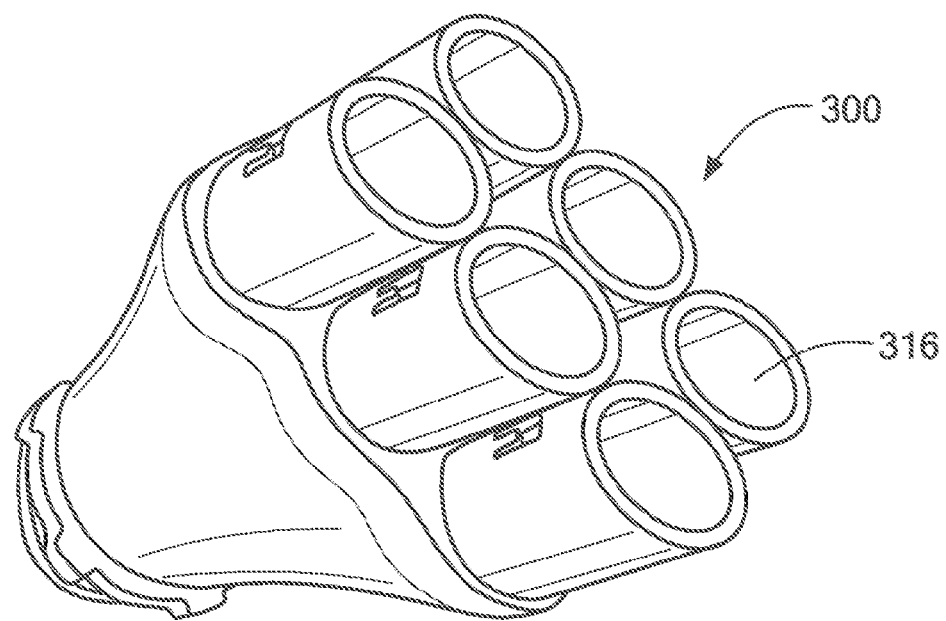
FIG. 3 is a view of an alternative embodiment of multi-hub electrical fitting according to the disclosure.
Figure 3A:
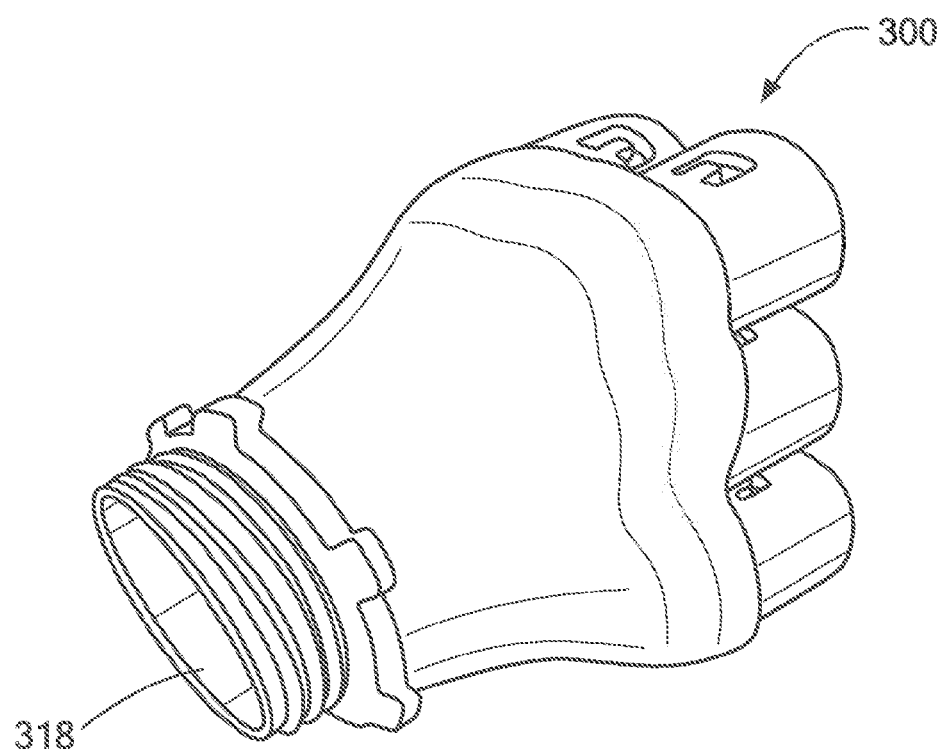
FIG. 3A is a different view of an alternative embodiment of multi-hub electrical fitting according to the disclosure.

Referring now to FIGS. 3 and 3A, an alternative embodiment of multi-hub electrical fitting 300 is shown where here there are six inbound bores 316 with a single outbound bore 318. Here, the multi-hub electrical fitting 300 is configured to receive six cables and to terminate at a 1" standard electrical trade size opening with 1" lock-nut. This allows the electrician to utilize all existing pre-punched knock outs including the one inch opening.

Any one of the multi-hub electrical fittings taught in this disclosure could be configured using standard ¾", 1", 1¼", 1½", 2", etc or metric 21, 27, 35, 41 etc. electrical trade sizes. The multi-hub electrical fitting could have an internal threaded hub to adapt to electrical trade sizes conduit. The multi-hub electrical fitting could have an external thread to receive an electrical trade sizes lock-nut. The multi-hub electrical fitting could have an external clip to terminate in electrical trade sizes openings (quick connect). The multi-hub electrical fitting could have a setscrew or compression hub to receive an electrical trade size EMT. The multi-hub electrical fitting could have setscrew clamps to receive the individual cables, many other types are available to meet certain classification requirements and any one of the various types could be incorporated into this fitting.

Figure 4:
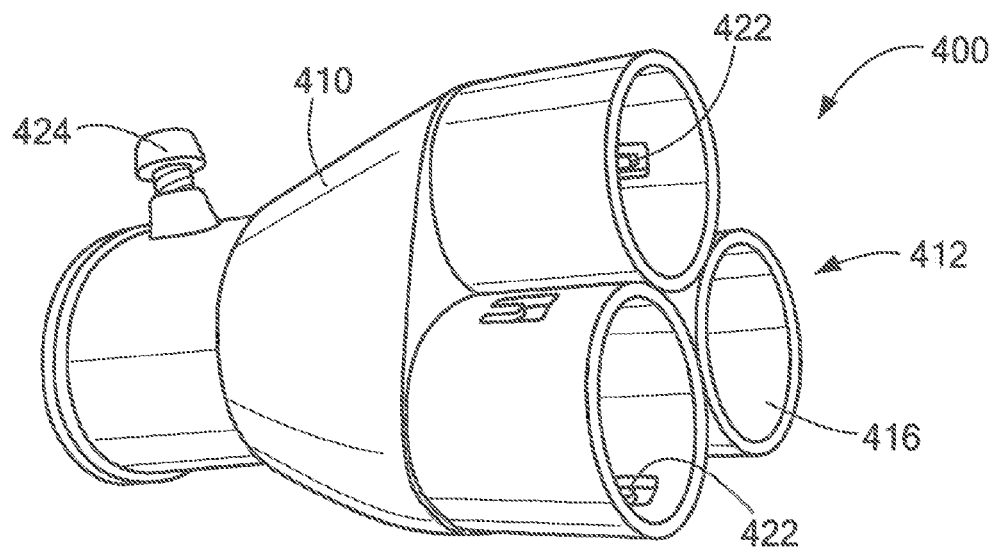
FIG. 4 is a view of a second alternative embodiment of multi-hub electrical fitting according to the disclosure.
Figure 4A:
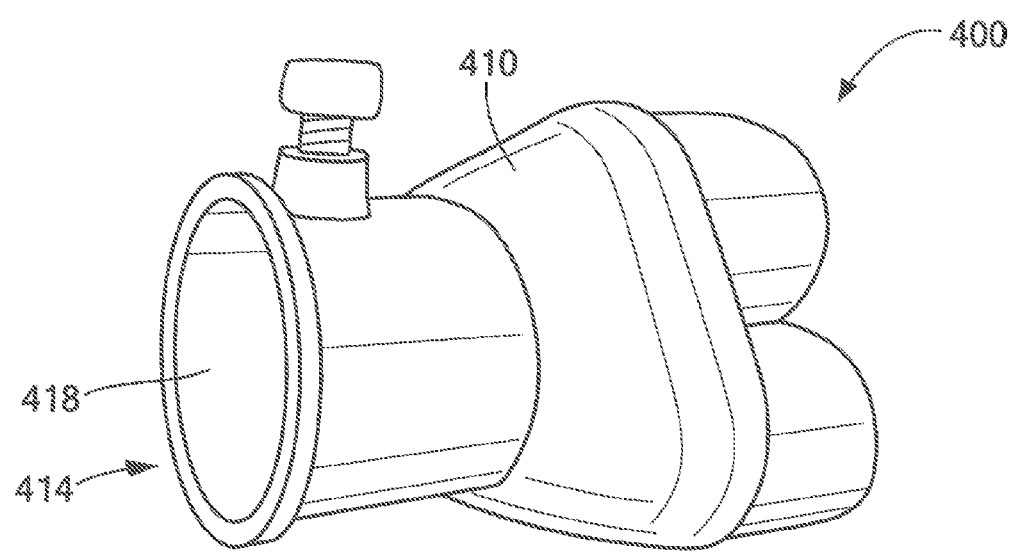
FIG. 4A is a different view of a second alternative embodiment of multi-hub electrical fitting according to the disclosure.
Figure 4B:
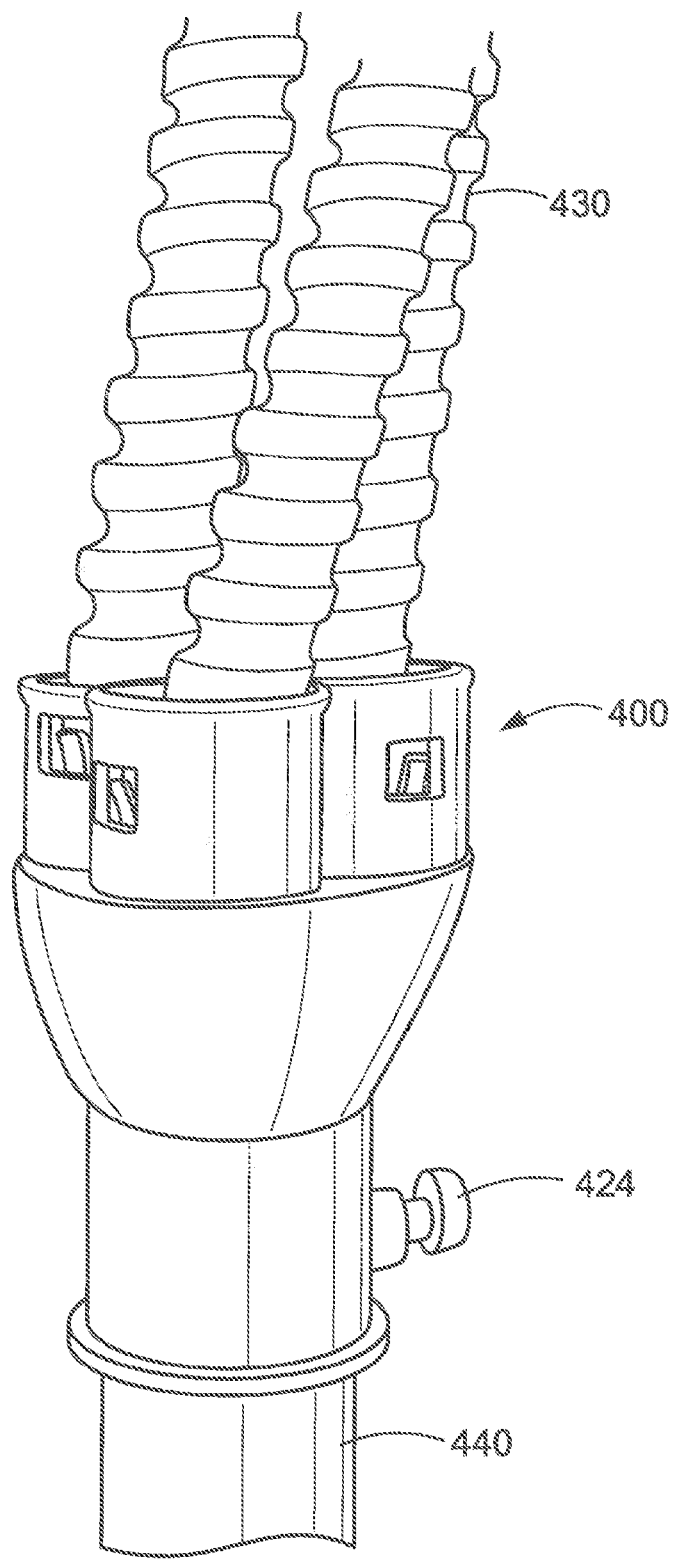
FIG. 4B is a view of a second alternative embodiment of multi-hub electrical fitting according to the disclosure in use connecting multiple cables to a single conduit pipe.

Referring now to FIGS. 4, 4A and 4B, a second alternative embodiment of a multi-hub electrical fitting 400 is shown. Here the multi-hub electrical fitting 400 includes a connector body 410 constructed of metal with the connector body 410 including an inbound end 412 and an outbound end 414. The inbound end 412 of the connector body 410 includes a plurality of inbound bores 416, here three holes as shown, for receiving electrical cable 430. An outbound bore 418 is included in said outbound end 414. An end stop 420 within said connector body 410 segregates said inbound bores 412 from said outbound bore 418 and prevents the cable 430 from being overly inserted. An attachment arrangement 422 on said inbound end 412 is used for securing and holding electrical cable 430 within each inbound bore 416. An attachment arrangement 424 on said outbound end 414 for securing said electrical fitting to a pipe 440 here using set screws to terminate to a ¾" standard electrical trade size EMT.

Figure 5:
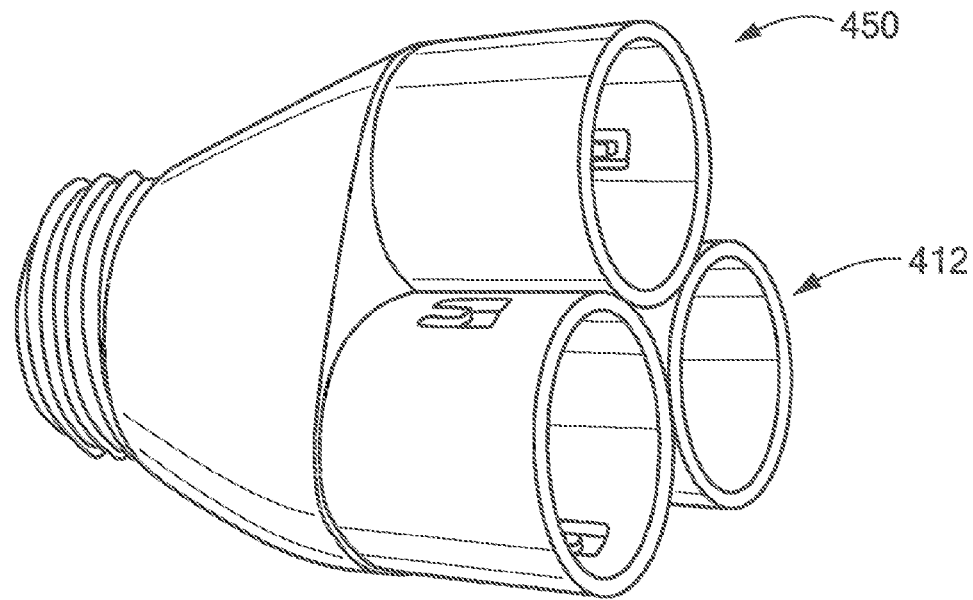
FIG. 5 is a view of a third alternative embodiment of multi-hub electrical fitting according to the disclosure.
Figure 5A:
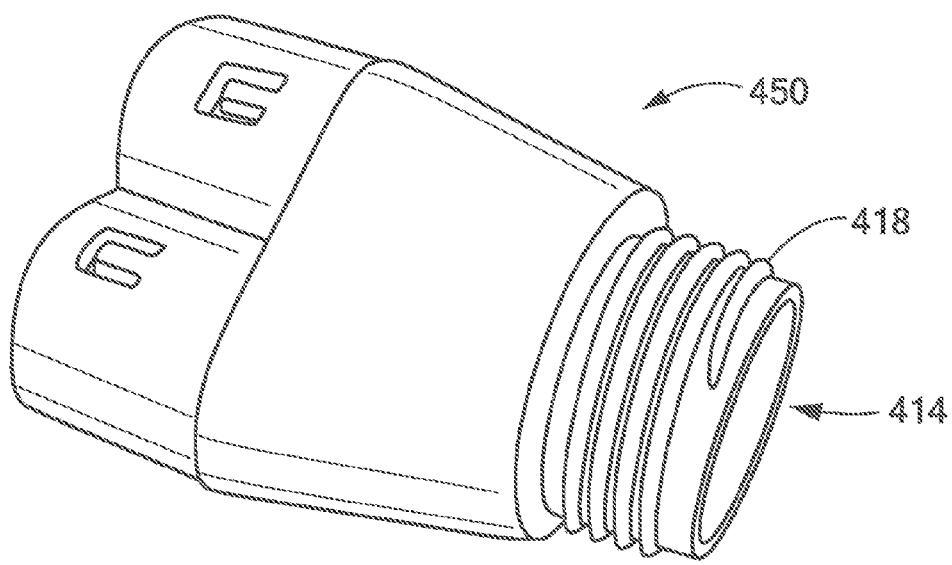
FIG. 5A is a different view of a third alternative embodiment of multi-hub electrical fitting according to the disclosure.
Figure 5B:
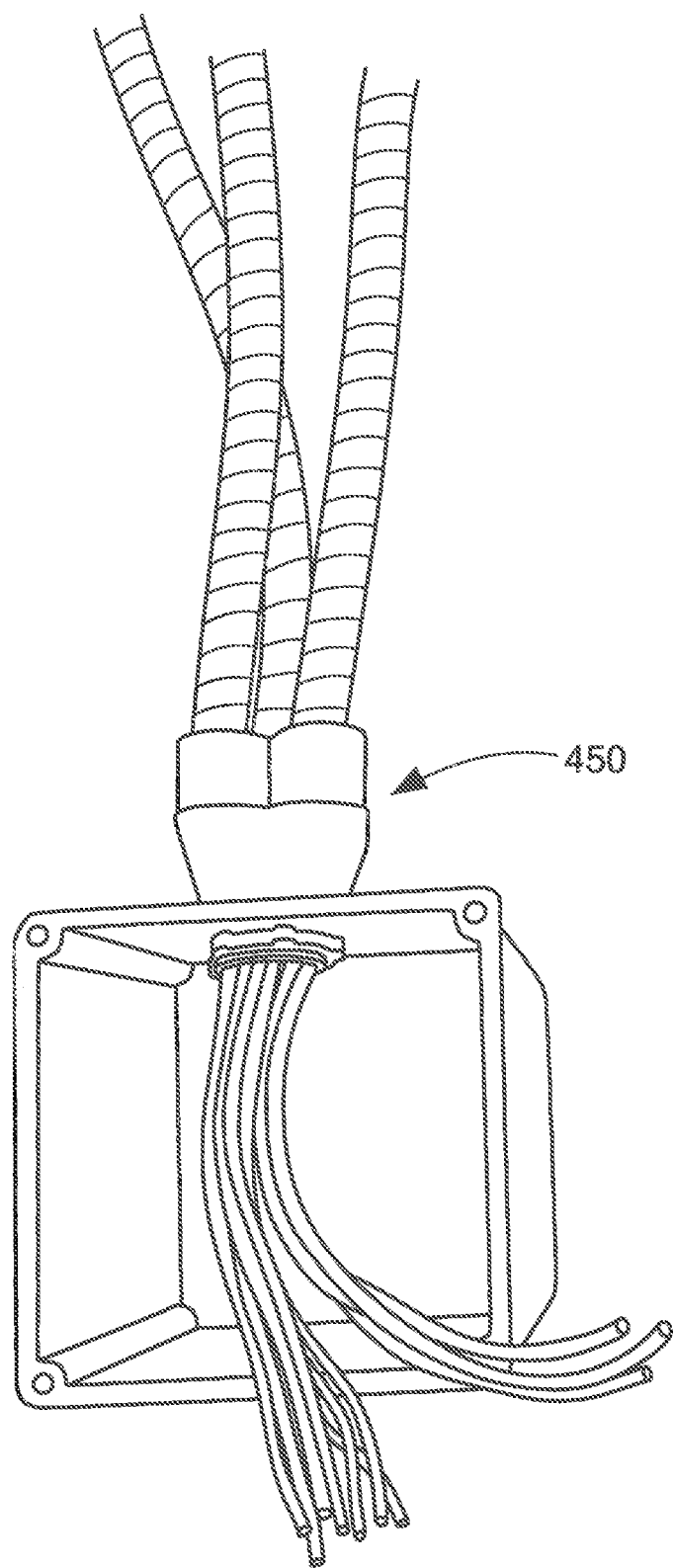
FIG. 5B is a view of a third alternative embodiment of multi-hub electrical fitting according to the disclosure in use connecting multiple cables to a single electrical box.

Referring now to FIGS. 5, 5A and 5B, another alternative embodiment of a multi-hub electrical fitting 450 is shown. Here the multi-hub electrical fitting 450 includes a connector body 410 constructed of metal with the connector body 410 including an inbound end 412 but here the outbound end 414 is configured as a threaded end 418 and can be secured to an electrical panel or box using a lock nut. Here, a ¾" standard electrical trade size opening with ¾" lock-nut was used. It should be appreciated the outbound end 414 can be configured either to form a standard box connection or conduit pipe connection. With such an arrangement, a cost savings to a contractor is provided by reducing the number of steps and material required to terminate multiple cables at any given location.

As an example, in a fairly common electrical installation with 60 MC cables terminating at two electric panels, it should, be noted, with the use of the multi-hub electrical fitting, the following steps are eliminated, and the labor savings with multi-hub electrical fittings alone could easily reach 40 man hours not including the labor costs associated with material handling and processing (ordering, receiving, delivering, etc.):

1. Measure to install 12 conduits between panels and wire way.
2. Provide 24 matching bends to fit 12 conduits between panels and wire way.
3. Measure wire way to fit conduits.
4. Drill and punch 12 holes to receive conduits
5. Install and secure wire way
6. Layout and drill 60 holes to receive MC cables.
7. Install connectors in wire way to receive MC cable.
8. Install MC cable into wire way and tighten clamps.
9. Sort cables and install in conduits.
10. Install cover to close wire way.

Additional material maybe required if a fire rated access panel needs to be installed in a space for this installation to meet code.

Having understood the disclosure, it should now be appreciated, the multi-hub electrical fitting reduces the time an electrician needs to prepare panel boards and junction box's to receive large quantities of cable. It further eliminates the need for additional costly material (boxes, wire-ways, clamps, support material etc.). It provides for future expansion and easy access to electrical equipment. As taught, one embodiment would be multiple BX type cable terminating fittings molded together on one side to form a HUB with an external threaded box type connector on the opposite end. Another embodiment would be multiple BX type cable terminating fittings molded together on one side to form a HUB with an internal threaded hub type connector to adapt to a threaded conduit on the opposite end. Another embodiment would be multiple BX type cable terminating fittings molded together on one side to form a HUB with a molded EMT type connector on the opposite end. Another embodiment would be multiple Flex type cable terminating fittings molded together on one side to form a HUB with an external threaded box type connector on the opposite end. Still another embodiment would be multiple Flex type cable terminating fittings molded together on one side to form a HUB with an internal threaded hub type connector to adapt to a threaded conduit on the opposite end. Another embodiment would be multiple Flex type cable terminating fittings molded together on one side to form a HUB with a molded EMT type connector on the opposite end. Another embodiment would be multiple EMT terminating fittings molded together on one side to form a HUB with an external threaded box type connector on the opposite end. Another embodiment would be multiple EMT terminating fittings molded together on one side to form a HUB with an internal threaded hub type connector to adapt to a threaded conduit on the opposite end. Still another embodiment would be multiple EMT terminating fittings molded together on one side to form a HUB with a molded EMT type connector on the opposite end. Another embodiment would be a Hub capable of receiving multiple standard single and duplex connectors. This device would be molded in a fashion that standard "snap in" and threaded type connectors would have space available to terminate on one side of the hub.

A number of embodiments of the disclosure have been described. Nevertheless, it will be understood that various modifications may be made without departing from the spirit and scope of the disclosure. For example, the multi-hub electrical fitting could be fabricated from a material other than metal if local electrical codes permitted non-metallic materials for electrical fittings. An electrical HUB type fitting could also be fashioned to accommodate other non-metallic electrical cable types. Accordingly, other embodiments are within the scope of the following claims.

What is claimed is:

1. A multi-hub electrical fitting for receiving conduits or electrical cables and passing corresponding electrical wires through the multi-hub electrical fitting comprising, a connector body constructed of metal, said connector body including an inbound end and an outbound end; at least three inbound bores in said inbound end of said connector body, each inbound bore capable to receive a corresponding conduit or electrical cable; an outbound bore in said outbound end; an end stop within said connector body segregating said inbound bores from said outbound bore; an attachment arrangement on said inbound end for securing and holding the corresponding conduit or electrical cable within each inbound bore; and an attachment arrangement on said outbound end for securing said electrical fitting to a panel; the connector body adapted to provide a path for the electrical wires from each conduit or electrical cable from the inbound end to the outbound end; the at least three inbound bores comprising an outer bore and an internal bore; and the electrical fitting further comprising inspection holes wherein a corresponding inspection hole disposed in the connector body extends internally from the connector body through walls of the outer bore to an inner wall of the internal bore.

2. The multi-hub electrical fitting as recited in claim 1 wherein the at least three inbound bores comprise eighteen inbound bores and the inspection holes are aligned so an inner inspection hole can be viewed through the walls of the outer bore with an outer inspection hole.

3. The multi-hub electrical fitting as recited in claim 1 wherein the connector body has an elongated neck to extend the outbound end.

4. The multi-hub electrical fitting as recited in claim 1 wherein the connector body is a unitary connector body integrally formed as a metal casting.

5. The multi-hub electrical fitting as recited in claim 1 wherein the attachment arrangement on said inbound end comprises cable retaining tangs being inwardly bent at an angle relative to the surface of said bore in the direction of said outbound end whereby said cable retaining tangs permit insertion of the corresponding conduit or electrical cable therethrough and prohibits unintentional separation of the conduit or electrical cable therefrom.

6. The multi-hub electrical fitting as recited in claim 1 wherein the at least three inbound bores are molded together on said inbound end on one side to form a hub.

7. The multi-hub electrical fitting as recited in claim 1 wherein the at least three inbound bores comprise six inbound bores.

8. A multi-hub electrical fitting for receiving conduits or electrical cables and passing corresponding electrical wires through the multi-hub electrical fitting comprising, a connector body including an inbound end and an outbound end; at least three inbound bores in said inbound end of said connector body, each inbound each inbound bore capable to receive a corresponding conduit or electrical cable; and an outbound bore in said outbound end; the connector body adapted to provide a path for the electrical wires from each conduit or electrical cable from the inbound end to the outbound end; the at least three inbound bores comprising an outer bore and an internal bore; and the electrical fitting further comprising inspection holes wherein a corresponding inspection hole disposed in the connector body extends internally from the connector body through walls of the outer bore to an inner wall of the internal bore.

9. The multi-hub electrical fitting as recited in claim 8 wherein the at least three inbound bores are molded together on said inbound end on one side to form a hub.

10. The multi-hub electrical fitting as recited in claim 8 wherein the connector body is constructed of metal.

11. The multi-hub electrical fitting as recited in claim 8 comprising: an attachment arrangement on said inbound end for securing and holding the corresponding conduit or electrical cable within each inbound bore; and an attachment arrangement on said outbound end for securing said electrical fitting to a panel or pipe.

12. The multi-hub electrical fitting as recited in claim 8 wherein the at least three inbound bores comprise eighteen inbound bores and the inspection holes are aligned so an inner inspection hole can be viewed through the walls of the outer bore with an outer inspection hole.

13. The multi-hub electrical fitting as recited in claim 8 wherein the connector body has an elongated neck to extend the outbound end.

14. An electrical connector assembly for receiving electrical cables or conduits and passing corresponding electrical wires through the electrical connector assembly comprising, a connector body having an outlet end portion and an inlet end portion; at least three inlet openings disposed in the inlet end portion adapted to receive a corresponding electrical cable or conduit; and an outlet opening disposed in the outlet end portion; the connector body adapted to provide a path for the electrical wires from the electrical cable or conduit from the inlet end portion to the outlet end portion; the at least three inlet openings comprising an outer bore and an internal bore; and wherein each inlet opening comprises an inspection hole; a corresponding inspection hole disposed in the connector body extends internally from the connector body through walls of the outer bore to an inner wall of the internal bore.

15. The electrical connector assembly as recited in claim 14 comprising means for securing the electrical cable or conduit to each inlet opening.

16. The electrical connector assembly as recited in claim 15 wherein the means for securing the electrical cable or conduit to each inlet opening comprises retaining tangs being inwardly bent at an angle relative to the surface of said inlet opening in the direction of said outlet end portion whereby said retaining tangs permit insertion of the electrical cable or conduit therethrough and prohibits unintentional separation of the electrical cable or conduit therefrom.

17. The electrical connector assembly as recited in claim 14 wherein the at least three inlet openings comprise eighteen inlet openings and the inspection holes are aligned so an inner inspection hole can be viewed through the walls of the outer bore with an outer inspection hole.

* * * * *